United States Patent
Lindsay et al.

(10) Patent No.: US 10,142,451 B2
(45) Date of Patent: Nov. 27, 2018

(54) METHOD AND APPARATUS PERTAINING TO DEPICTING A PLURALITY OF CONTACT ADDRESSES

(75) Inventors: Donald James Lindsay, Mountain View, CA (US); Erik Artur Greisson, Malmö (SE)

(73) Assignee: BlackBerry Limited, Waterloo, Ontario (CA)

(*) Notice: Subject to any disclaimer, the term of this patent is extended or adjusted under 35 U.S.C. 154(b) by 1341 days.

(21) Appl. No.: 13/405,680

(22) Filed: Feb. 27, 2012

(65) Prior Publication Data

US 2013/0222269 A1  Aug. 29, 2013

(51) Int. Cl.
*G06F 3/041* (2006.01)
*H04M 1/2745* (2006.01)
*G06F 3/0488* (2013.01)

(52) U.S. Cl.
CPC ..... *H04M 1/274583* (2013.01); *G06F 3/0488* (2013.01); *G06F 3/04886* (2013.01); *H04M 1/27455* (2013.01); *H04M 1/274508* (2013.01); *H04M 2250/22* (2013.01)

(58) Field of Classification Search
USPC .......... 345/173; 455/564; 715/738, 780, 753
See application file for complete search history.

(56) References Cited

U.S. PATENT DOCUMENTS

| 6,606,381 | B1* | 8/2003 | Wunsch | 379/356.01 |
| 7,231,229 | B1* | 6/2007 | Hawkins | H04M 1/274558 345/1.1 |
| 2008/0165136 | A1* | 7/2008 | Christie | G06F 3/0482 345/173 |
| 2011/0087990 | A1* | 4/2011 | Ng | G06F 3/04886 715/773 |
| 2011/0111735 | A1* | 5/2011 | Pietrow | H04M 1/642 455/414.1 |
| 2012/0063585 | A1* | 3/2012 | Gravino | H04M 1/274516 379/218.01 |

FOREIGN PATENT DOCUMENTS

EP  2112809 A1 * 10/2009 ............. G06F 3/048

OTHER PUBLICATIONS

Kanlis, Angelos; Examiner; Extended European Search Report from related European Patent Application No. 13157077.2. dated May 28, 2013; 7 pages.

Linco, Reginald; Examiner; Canadian Office Action from related Canadian Patent Application No. 2,807,761 dated May 16, 2014; 2 pages.

* cited by examiner

*Primary Examiner* — Amare Mengistu
*Assistant Examiner* — Shawna Stepp Jones
(74) *Attorney, Agent, or Firm* — Jose Gutman; Fleit Gibbons Gutman Bongini & Bianco P.L.

(57) ABSTRACT

A control circuit provides a list of contacts on a touch-screen display and then, in response to detecting a touch-based selection of a particular contact, responsively depicts a plurality of contact addresses as correspond to that particular contact. A most frequently utilized contact address is placed at a location on the touch-screen display that corresponds to the touch-based selection of the particular contact. So configured, the user need likely not move their touching finger to locate the desired contact address. The most frequently utilized contact address can comprise a most frequently called telephone number since any new telephone number was last added to the plurality of telephone numbers for this particular contact.

18 Claims, 3 Drawing Sheets

METHOD AND APPARATUS PERTAINING TO DEPICTING A PLURALITY OF CONTACT ADDRESSES

FIELD OF TECHNOLOGY

The present disclosure relates to communication devices and more particularly to lists of contacts.

BACKGROUND

Communication devices, including portable communication devices, often store contact addresses of interest to a user of the device. These contact addresses can comprise, for example, telephone numbers. Many communication devices are physically capable of storing many thousands of such contacts and their contact addresses.

Lists of contacts are often arranged alphabetically to facilitate locating a particular contact of interest. Upon selecting a particular contact, the corresponding contact addresses for that selected contact are then often displayed pursuant to some predetermined order of presentation. For example, home telephone numbers may always be presented ahead of business telephone numbers.

While available approaches regarding the presentation and use of lists of contacts are suitable for at least some application settings, there nevertheless exists room for improvement.

DETAILED DESCRIPTION

Figure 1:
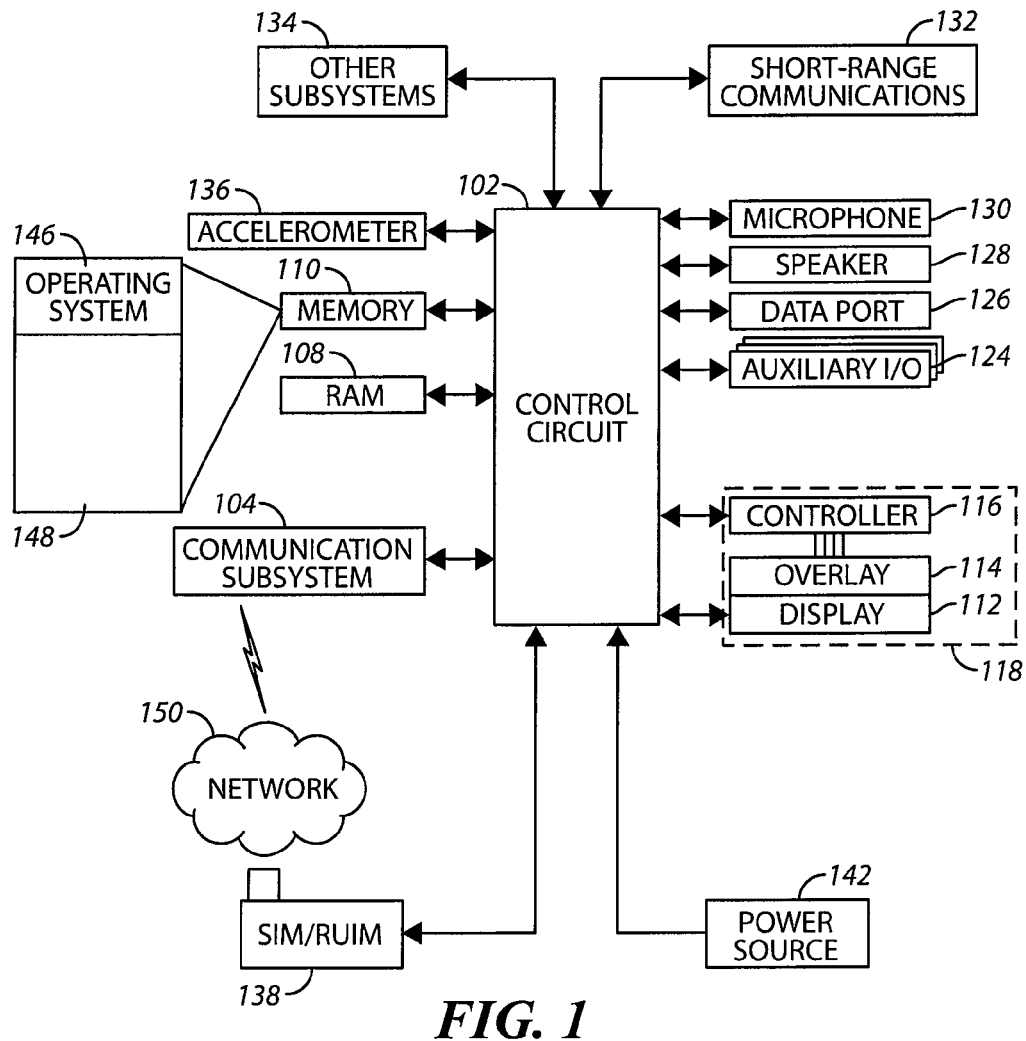
FIG. 1 is a block diagram in accordance with the disclosure.

The following describes an apparatus and method pertaining to a control circuit that provides a list of contacts on a touch-screen display and then, in response to detecting a touch-based selection of a particular contact within that list of contacts, responsively depicts a plurality of contact addresses as correspond to that particular contact. By one approach a most frequently utilized contact address of that plurality of contact addresses is placed at a location on the touch-screen display that corresponds to the just-previous touch-based selection of the particular contact. So configured, the user need likely not move their touching finger (in the x or y direction across the display) as the desired contact address will likely already be beneath that finger.

By one approach, the most frequently utilized contact address will comprise a most frequently called telephone number since any new telephone number was last added to the plurality of telephone numbers for this particular contact. So configured, a newly-entered number can relatively quickly become the most frequently called number notwithstanding the relative newness of this newly-entered number.

These teachings are highly flexible in practice and will accommodate a wide variety of variations with respect to implementation. These teachings are also highly scalable and can be successfully employed with essentially any number of contact addresses and/or contacts in a given list of contacts. In fact, to a considerable extent, the utility and benefit of these teachings increases as the number of contact addresses for any given contact increases.

So configured, these teachings provide a highly intuitive and simple approach to providing a user with the right information at the right time. Generally speaking, a user can benefit from the described approaches with little or no training as the described activities can be carried out in a highly transparent manner that relies upon the user's ordinary actions and without requiring any particular special instructions and user-initiated learning mode.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Referring to FIG. 1, an exemplary portable electronic device includes a control circuit 102 (such as a properly programmed processor) that controls the overall operation of the portable electronic device. Communication functions, including data and voice communications, are performed through a communication subsystem 104. The communication subsystem receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device.

The control circuit 102 interacts with other elements, such as a Random Access Memory (RAM) 108, a memory 110, a display 112 with a touch-sensitive overlay 114 operably coupled to an electronic controller 116 that together comprise an optional touch-sensitive display 118 (sometimes referred to herein as a touch-screen display), an auxiliary input/output (I/O) subsystem 124 (which might comprise, for example, a physical keyboard such as a full QWERTY keyboard), a data port 126, a speaker 128, a microphone 130, a short-range communication subsystem 132 (such as, for example, a Bluetooth-based short-range communication subsystem), and other device subsystems 134 of choice.

One or more user interfaces are provided. Input via a graphical user interface is provided via the touch-sensitive overlay 114. The control circuit 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the control circuit 102.

The control circuit 102 may interact with an accelerometer 136 that may be utilized to detect direction of gravitational forces or gravity-induced reaction forces.

To identify a subscriber for network access, the portable electronic device may utilize a Subscriber Identity Module or a Removable User Identity Module (SIM/RUIM) card 138 for communication with a network, such as the wireless network 150. Alternatively, user identification information may be programmed into the memory 110.

The portable electronic device includes an operating system 146 and software programs, applications, or components 148 that are executed by the control circuit 102 and are typically stored in a persistent, updatable store such as the memory 110. Additional applications or programs may be loaded onto the portable electronic device through the wireless network 150, the auxiliary I/O subsystem 124, the data port 126, the short-range communications subsystem 132, or any other suitable subsystem 134. The memory 110 may comprise a non-transitory storage media that stores executable code that, when executed, causes the control circuit 102 to carry out one or more of the functions or actions described herein.

A received signal such as a text message, an e-mail message, or web page download is processed by the communication subsystem and input to the control circuit 102. The control circuit 102 processes the received signal for output to the display 112 and/or to the auxiliary I/O subsystem 124. A subscriber may generate data items, for example e-mail messages, that may be transmitted over the wireless network 150 through the communication subsystem. For voice communications, the overall operation of the portable electronic device is similar. The speaker 128 outputs audible information converted from electrical signals and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. One or more touches, also known as touch contacts, touch events, or sometimes gestures may be detected by the touch-sensitive display 118. The control circuit 102 may determine attributes of the touch, including a location, direction, and/or extent of a touch. Touch location data may include data for an area of contact or data for a single point of contact, such as a point at or near a center of the area of contact.

Figure 2:
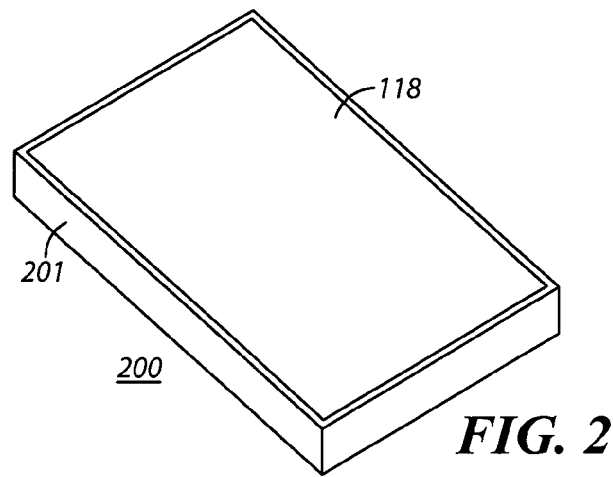
FIG. 2 is a perspective view in accordance with the disclosure.

Referring to FIG. 2, for the sake of illustration but without intended any limitations in these regards, the following description will presume that the portable electronic device comprises a portable two-way wireless communications device 200 such as a so-called smartphone. Such a device 200 often comprises a housing 201 to contain the foregoing components and a touch-screen display 118.

Figure 3:
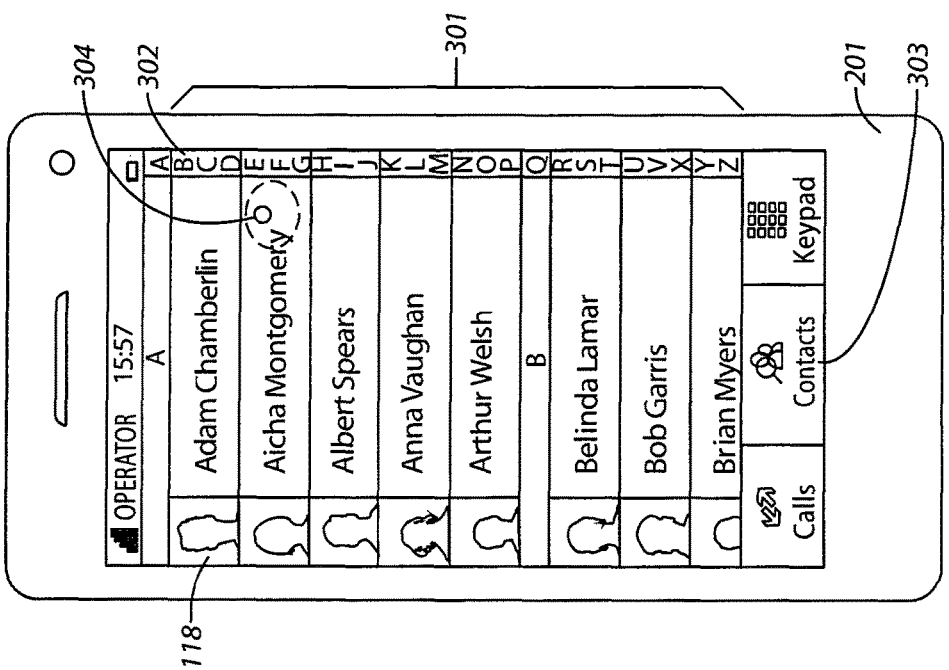
FIG. 3 is a top plan view in accordance with the disclosure.

Pursuant to these teachings the control circuit 102 provides a list of contacts 301 on the touch-screen display 118. An illustrative, non-limiting example in these regards is shown in FIG. 3. In this example the list of contacts 301 comprises a vertical stack of simultaneously-displayed individual contacts (such as "Adam Chamberlin" and "Belinda Lamar" as illustrated). Other approaches are of course possible, including a horizontally-arranged presentation.

In this example the individual contacts are alphabetically arranged. As only a few of the total available contacts can be displayed simultaneously, in this illustrative example the user can scroll through the listing (for example, by using their finger to make a sliding gesture in the direction of desired scrolling). An A-Z index 302 can also be provided as shown. By simply tapping on a letter in the A-Z index 302 that corresponds to the first letter in the contact's name, the display listing can immediately shift to those contacts that correspond to the selected letter.

Figure 4:
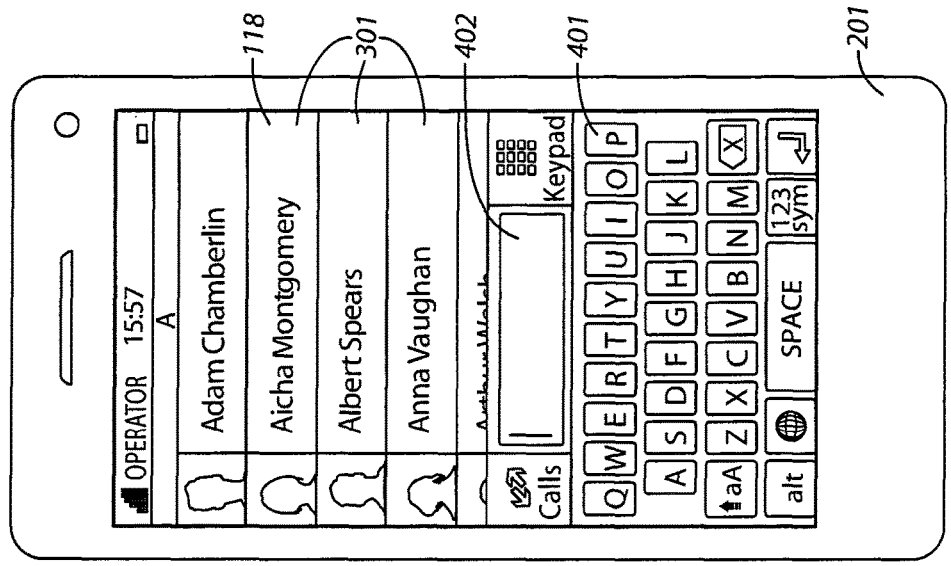
FIG. 4 is a top plan view in accordance with the disclosure.

These teachings will also accommodate other kinds of searches. For example, a search-contacts button 303 can cause a virtual keyboard 401 and a corresponding search field 402 to appear on the touch-screen display 118 as illustrated in FIG. 4. By one approach (and as illustrated) this virtual keyboard 401 overlays only a portion of the list of contacts 301. Using this keyboard 401 a user can type letters into the search field 402 to thereby enter a specific search expression (such as a specific name).

In this illustrative example the user can easily remove this virtual keyboard 401 by simply touching the list of contacts 301. In particular, when the control circuit 102 detects a user's touch-based interaction with the list of contacts 301, the control circuit can responsively remove the virtual keyboard 401 from the touch-screen display 118.

Referring again to FIG. 3, a user can select a particular contact within the list of contacts 301 by touching or tapping the particular contact of interest. The circular region denoted by reference numeral 304 represents, for the sake of illustration, where the user has tapped the touch-screen display 118 in order to select the contact named "Aicha Montgomery."

Figure 5:
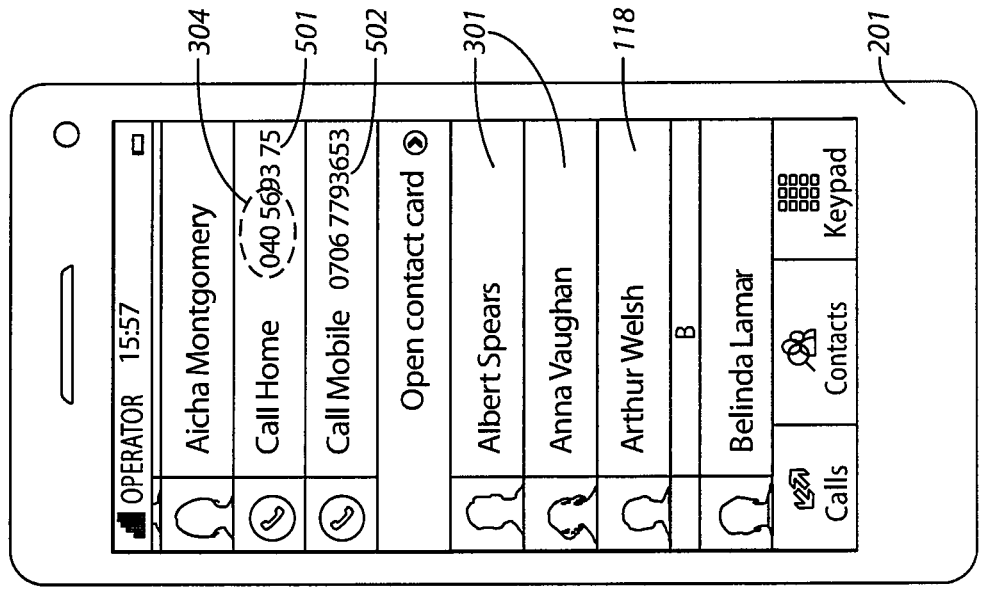
FIG. 5 is a top plan view in accordance with the disclosure.

In response, and as illustrated in FIG. 5, the control circuit 102 responsively depicts a plurality of contact addresses 501 and 502 as correspond to this particular contact (again in a vertical stack for the sake of an illustrative example). More particularly, in this illustrative example this plurality of contact addresses 501 and 502 are disposed such that a most frequently utilized contact address (in this case, the home number for Aicha Montgomery) is placed at the location 304 on the touch-screen display 118 that corresponds to where the user most recently touched the touch-screen display 118 to select this particular contact.

To accommodate this positioning of the most frequently utilized contact address for this particular contact, the contact's name is moved up on the display and the contact's other contact address (i.e., her mobile telephone number) is displayed beneath the home telephone number. So positioned, the user need not move their finger in the X or Y directions (i.e., parallel to the touch-screen display 118) in order to be poised to select that most frequently utilized contact address. Instead, all the user need do is to again lower their finger to tap that same spot 304 on the touch-screen display 118. Since this particular contact address is the most frequently utilized contact address for this particular contact, this means that at least most of the time the user will likely be able to quickly (and without moving their finger about the touch-screen display 118 in order to reposition that finger) select the desired contact address for their selected contact. This can save time and effort and can even promote safety and precision in an appropriate application setting.

These teachings will accommodate various approaches with respect to identifying the most frequently utilized contact address for a given contact. If desired, for example, this approach can take into account that the user is likely to add new contact addresses (such as new telephone numbers) to their contact information from time to time. Accordingly, by one approach and by way of example, the control circuit 102 can automatically reset a frequency (of use) count regarding usage of a plurality of telephone numbers for a given contact in response to a new telephone number being added to that plurality of telephone numbers. Using this approach, the most frequently called telephone number for a given contact will comprise the telephone number most frequently called since any new telephone number was last added to the plurality of telephone numbers for that particular contact. As a result, even a newly-added number can very quickly assume the "most frequent" positioning described above by being selected by the user more frequently than the other numbers for the corresponding contact.

So configured, while all of the contact addresses for a given contact will typically be displayed (when the user selects that given contact) and hence available for user selection, the most frequently used contact addresses will be positioned directly beneath the user's last touch location on the touch-screen display 118 in order to minimize the distance the user must move their finger in order to select that particular contact address.

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. An apparatus comprising:
   a wireless transceiver;
   a touch-screen display; and
   a control circuit operably coupled to the touch-screen display and the wireless transceiver and configured to:
   display on the touch-screen display a list of contacts, each contact within the list of contacts comprising an area of touch-based selection on the touch-screen display that is separate from an area of touch-based selection on the touch-screen display of each other contact within the list of contacts; and
   in response to detecting a touch-based selection of a particular contact by detecting a touch at a touch location on the touch-screen display within the area of touch-based selection of the particular contact within the list of contacts, responsively displaying a plurality of contact addresses associated with the particular contact, each contact address within the plurality of contact addresses comprising an area of touch-based selection on the touch-screen display that is separate from an area of touch-based selection on the touch-screen display of each other contact address within the plurality of contact addresses, such that an area of touch-based selection of a most frequently utilized contact address of the plurality of contact addresses is displayed including therewithin the touch location on the touch-screen display of the touch-based selection of the particular contact.

2. The apparatus of claim 1 wherein the display of the list of contacts comprises a display of the contacts in a vertical stack.

3. The apparatus of claim 1 wherein the plurality of contact addresses comprises a plurality of telephone numbers.

4. The apparatus of claim 3 wherein the most frequently utilized contact address comprises a most frequently called one of the plurality of telephone numbers.

5. The apparatus of claim 4 wherein the mostly frequently called one of the plurality of telephone numbers comprises a telephone number most frequently called since any new telephone number was last added to the plurality of telephone numbers for the particular contact.

6. The apparatus of claim 5 wherein the control circuit is further configured to:
   automatically reset a frequency count regarding usage of the plurality of telephone numbers in response to a new telephone number being added to the plurality of telephone numbers.

7. The apparatus of claim 1 wherein the control circuit is configured to depict the plurality of contact addresses by depicting the plurality of contract addresses in a vertical stack.

8. The apparatus of claim 1 wherein the control circuit is further configured to:
   selectively display a virtual keyboard on the touch-screen display that overlays only a portion of the list of contacts; and
   upon detecting a user's touch-based interaction with the list of contacts, responsively removing the virtual keyboard from the touch-screen display.

9. The apparatus of claim 1, wherein the control circuit is further configured to:
   after the displaying of the plurality of contact addresses associated with the particular contact, detecting a touch-based selection of the most frequently utilized contact address by detecting a second touch in the displayed area of touch-based selection of the most frequently utilized contact address on the touch-screen display that includes the touch location of the touch-based selection of the particular contact.

10. A method comprising:
    at a control circuit:
    displaying a list of contacts on a touch-screen display, each contact within the list of contacts comprising an area of touch-based selection on the touch-screen display that is separate from an area of touch-based selection on the touch-screen display of each other contact within the list of contacts; and
    in response to detecting a touch-based selection by detecting a touch at a touch location on the touch-screen display within the area of touch-based selection of a particular contact within the list of contacts, responsively displaying a plurality of contact addresses associated with the particular contact, each contact address within the plurality of contact addresses comprising an area of touch-based selection on the touch-screen display that is separate from an area of touch-based selection on the touch-screen display of each other contact address within the plurality of contact addresses, such that an area of touch-based selection of a most frequently utilized contact address of the plurality of contact addresses is displayed including therewithin the touch location on the touch-screen display of the touch-based selection of the particular contact.

11. The method of claim 10 wherein the most frequently utilized contact address comprises a most frequently called telephone number.

12. The method of claim 11 wherein the mostly frequently called telephone numbers comprises a telephone number for the particular contact that is most frequently called since any new telephone number was last added to the plurality of contact addresses for the particular contact.

13. The method of claim 12 further comprising:
    automatically resetting a frequency count regarding usage of telephone numbers for the particular contact in response to a new telephone number being added to the plurality of contact addresses for the particular contact.

14. The method of claim 10 further comprising:
    selectively displaying a virtual keyboard on the touch-screen display that overlays only a portion of the list of contacts; and
    upon detecting a user's touch-based interaction with the list of contacts, responsively removing the virtual keyboard from the touch-screen display.

15. The method of claim 10, wherein after the displaying of the plurality of contact addresses associated with the particular contact, detecting a touch-based selection of the most frequently utilized contact address by detecting a second touch in the displayed area of touch-based selection of the most frequently utilized contact address on the touch-screen display that includes the touch location of the touch-based selection of the particular contact.

16. A non-transitory computer storage medium having instructions stored therein, which instructions, when executed by a processor, cause the processor to:
    display on a touch-screen display a list of contacts, each contact within the list of contacts comprising an area of touch-based selection on the touch-screen display that is separate from an area of touch-based selection on the touch-screen display of each other contact within the list of contacts;
    in response to detecting a touch-based selection by detecting a touch at a touch location on the touch-screen display within the area of touch-based selection of a particular contact within the list of contacts, responsively displaying a plurality of contact addresses associated with the particular contact, each contact address within the plurality of contact addresses comprising an area of touch-based selection on the touch-screen display that is separate from an area of touch-based selection on the touch-screen display of each other contact address within the plurality of contact addresses, such that an area of touch-based selection of a most frequently utilized contact address of the plurality of contact addresses is displayed including therewithin the touch location on the touch-screen display of the touch-based selection of the particular contact.

17. The non-transitory computer storage medium of claim 16 wherein most frequently utilized contact addresses comprises a telephone number for the particular contact that is most frequently called since any new telephone number was last added to the plurality of contact addresses for the particular contact.

18. The non-transitory computer storage medium of claim 16, wherein after the displaying of the plurality of contact addresses associated with the particular contact, detecting a touch-based selection of the most frequently utilized contact address by detecting a second touch in the displayed area of touch-based selection of the most frequently utilized contact address on the touch-screen display that includes the touch location of the touch-based selection of the particular contact.

\* \* \* \* \*